United States Patent
Stiller et al.

(10) Patent No.: US 12,524,551 B2
(45) Date of Patent: Jan. 13, 2026

(54) ASSESSING COMPUTER SYSTEM VULNERABILITIES AND EXPOSURES

(71) Applicant: Crowdstrike, Inc., Sunnyvale, CA (US)

(72) Inventors: Timothy Stiller, Strasburg, VA (US); Brandon Stoy, Tampa, FL (US)

(73) Assignee: Crowdstrike, Inc., Sunnyvale, CA (US)

( * ) Notice: Subject to any disclaimer, the term of this patent is extended or adjusted under 35 U.S.C. 154(b) by 181 days.

(21) Appl. No.: 18/225,336

(22) Filed: Jul. 24, 2023

(65) Prior Publication Data

US 2025/0036771 A1    Jan. 30, 2025

(51) Int. Cl.
*G06F 21/57*      (2013.01)
*G06F 21/55*      (2013.01)

(52) U.S. Cl.
CPC .......... *G06F 21/577* (2013.01); *G06F 21/552* (2013.01); *G06F 2221/034* (2013.01)

(58) Field of Classification Search
CPC . G06F 21/577; G06F 21/552; G06F 2221/034
See application file for complete search history.

(56) References Cited

U.S. PATENT DOCUMENTS

| | | | |
|---|---|---|---|
| 11,973,784 B1* | 4/2024 | Erlingsson | G06F 9/5077 |
| 12,093,396 B2* | 9/2024 | Serna | G06F 21/577 |
| 2015/0033340 A1* | 1/2015 | Giokas | H04L 63/1433 |
| | | | 726/23 |
| 2023/0049789 A1* | 2/2023 | Seletskiy | G06F 21/577 |
| 2023/0205891 A1* | 6/2023 | Yellapragada | H04L 63/1416 |
| | | | 726/25 |
| 2023/0281316 A1* | 9/2023 | Lewandowski | G06F 21/577 |
| | | | 726/22 |

* cited by examiner

*Primary Examiner* — Chau Le
*Assistant Examiner* — Jacob Benedict Knackstedt
(74) *Attorney, Agent, or Firm* — Elliott, Ostrander & Preston, P.C.

(57) ABSTRACT

Assessing computer system vulnerabilities and exposures by periodically querying data sources to gather information pertaining to computing system vulnerabilities and exposures (CVEs), such as, for each CVE, an identification of the CVE, a number of corresponding references to the CVE, and a number of code repositories that can be used to exploit the CVE. Compiling a datastore of the information. Periodically querying the datastore about the information and generating one or more views of a lifecycle of each CVE in response thereto.

20 Claims, 3 Drawing Sheets

100

102

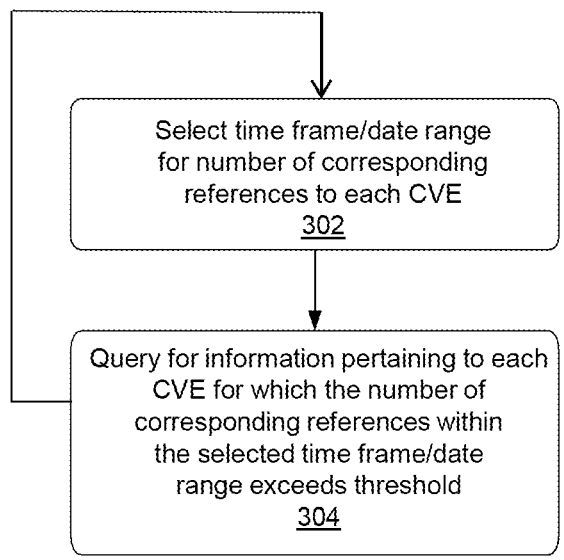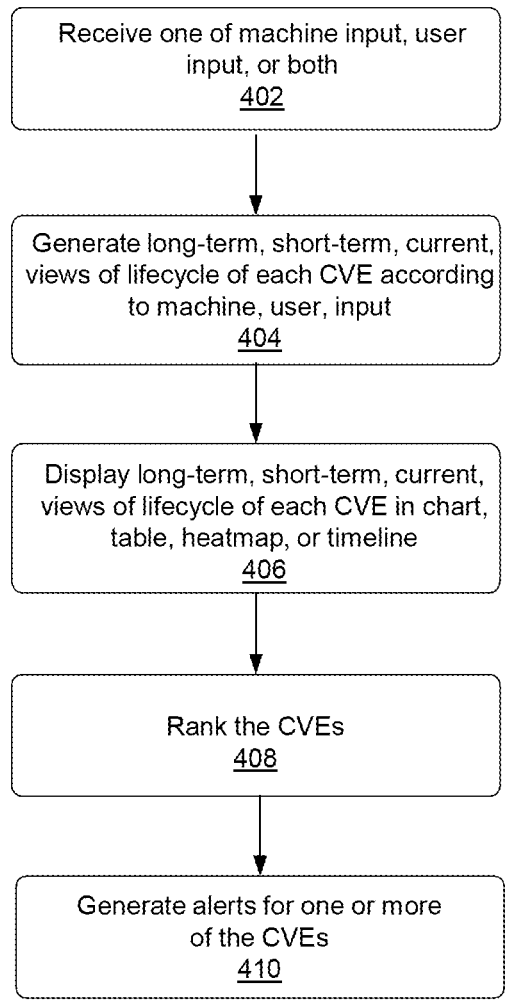

ASSESSING COMPUTER SYSTEM VULNERABILITIES AND EXPOSURES

TECHNICAL FIELD

Embodiments described herein relate to digital security systems, particularly for monitoring and assessing a likelihood of exploitation of computer system vulnerabilities and exposures (CVEs).

BACKGROUND

The high volume of computer system vulnerabilities and exposures ("CVEs", or simply, "vulnerabilities") publicly disclosed each year presents a unique challenge when determining which vulnerabilities have a higher likelihood of being exploited within particular computer networks, computer systems, software platforms, etc. For example, a single operating system may be associated with hundreds or even thousands of disclosed vulnerabilities in a single year. While vulnerabilities typically are assigned a severity score, the score does not necessarily correlate with actual observed exploitation of the corresponding vulnerability in particular computer networks or systems. Furthermore, time and resources are limited as it relates to researching vulnerabilities and developing corresponding methods for detecting and mitigating or eliminating the vulnerabilities.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 is a flowchart of aspects of the example method depicted in the flowchart of FIG. 1.

FIG. 4 is a flowchart of additional aspects of the example method depicted in the flowchart of FIG. 1.

DETAILED DESCRIPTION

Described herein are systems and methods that can address the above noted deficiencies in assessing computer system vulnerabilities and exposures ("CVEs", or "vulnerabilities"). A number of different data sources can be accessed in determining the presence of a vulnerability, the volume of corresponding chatter, mentions, or references, to the vulnerability (for example, in social media, blogs, online forums, etc.), and the availability and/or the number of code repositories that can be used to exploit the vulnerability. This information may be queried at predefined intervals to build a datastore containing (e.g., a database of) information about each vulnerability. This information may then be aggregated and monitored or compared over time to generate various views, such as long term, short term, and current or real time views, into each vulnerability's lifecycle. The data for each vulnerability can be displayed in a user interface (UI) using, for example, one or more charts, tables, heat maps and timelines. Such graphics provide insight into the time to develop code repositories that, for example, contain a proof of concept code base or minimum viable code base that can be used to exploit the vulnerability, interest amongst the broader security community, and relevance to or within an organization or company, or an organization or company's customer or subscriber base.

Embodiments can further use the information to generate rankings, and to notify users or service providers of a high probability of an exploitation of a vulnerability. The embodiments allow for filtering of the information to focus on smaller or more targeted areas of interest that may be more relevant to an individual, team, or organization, at a given time. The filtering aids in discovering edge cases within the vulnerability landscape that may otherwise be outweighed or overlooked by volumetric tracking alone.

Figure 1:
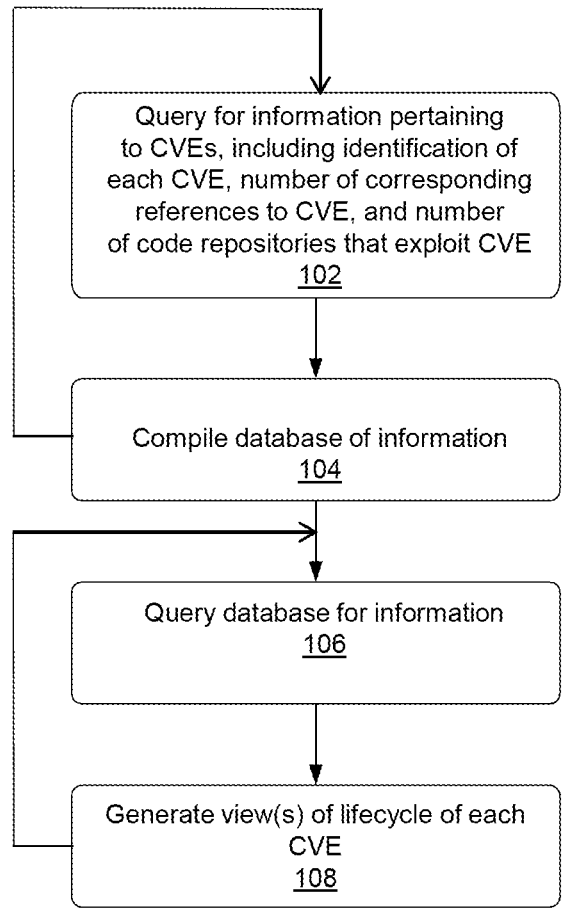
FIG. 1 is a flowchart of an example method according to embodiments of the invention.

According to an example, with reference to the flowchart 100 in FIG. 1, assessing network, or computer system vulnerabilities and exposures (CVEs), or simply, vulnerabilities, starts at block 102 with periodically querying data sources connected to a network system (e.g., servers or data repositories connected to the internet or the World Wide Web) to gather information pertaining to computing system vulnerabilities and exposures (CVEs). The queries may be repeated at selected intervals, such as every 15 minutes, half hour, hourly, daily, weekly, monthly, etc. The intervals may be defined by user or machine input. The data sources that are queried may include social media feeds; online forums or blogs; data or code repositories; corporate, IT, data security service provider, or public knowledge bases; search engines; the dark web; and the like.

The information that is gathered by the queries includes, for example, for each CVE: an identification of the CVE (e.g., the name of, or other identifying information about, a malware family, a known digital data security threat, or the like), a number of corresponding references to, mentions of, or chatter about the CVE found in the data sources, and a number of code repositories that can be used to exploit the CVE. The number of code repositories that can be used to exploit the CVE may include public, or open source, code repositories that can be used to exploit the CVE. Each code repository stores at least one software development asset that can be used to exploit the CVE. A software development asset includes but is not limited to one or more of: a proof of concept, such as a document, a presentation, or a demo; a prototype; a code base, or a minimum viable code base, that can be used as a starting point to exploit the CVE, or that can exploit the CVE.

The CVE information that is periodically gathered at block 102 is compiled or aggregated into a datastore or database (i.e., an organized collection of data that may or may not be controlled by a database management system) comprising such information at block 104. The information in the datastore, in turn, may be periodically queried, for example, automatically, or by a user, at block 106. In response to the query, one or more views of a lifecycle of each CVE may be generated at block 108.

Figure 2:
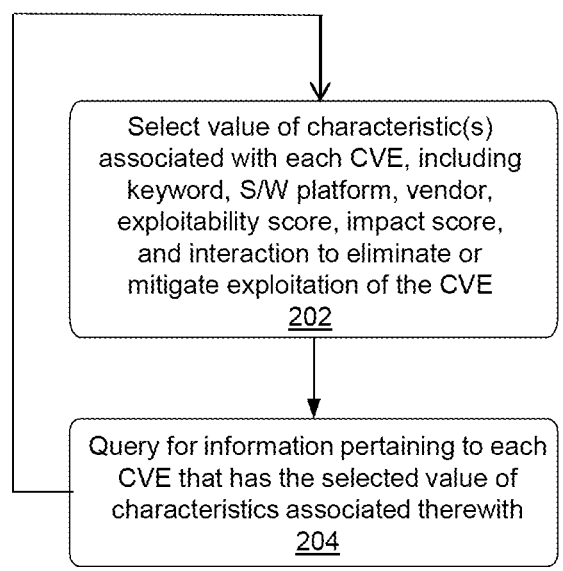
FIG. 2 is a flowchart of aspects of the example method depicted in the flowchart of FIG. 1.

With reference to FIGS. 1 and 2, periodically querying data sources to gather information pertaining to the plurality of CVEs at block 102 can include, for example, selecting at block 202 a value of one or more characteristics (e.g., metadata) associated with each CVE. Such characteristics include but are not limited to, a keyword, a software platform (e.g., a particular software application such as a particular web browser, e.g., Google Chrome, or a particular operating system, e.g., Microsoft Window), a vendor (e.g., Google, Microsoft), an exploitability score (i.e., a score that represents the ease or difficulty of exploiting the CVE), an impact score (i.e., a score that represents the damage inflicted on a network or computing system in which the CVE is exploited), and a recommended, and/or a required, interaction to either eliminate or mitigate the threat of exploitation of the CVE or recover from an exploitation of the CVE. Then, at block 204, the process continues with periodically querying the data sources to gather information pertaining to computing system vulnerabilities and exposures (CVEs) that have the selected values of the one or more characteristics. For example, the process may periodically query the data sources to gather information pertaining to CVEs for a particular malware family that targets a moderately difficult to exploit CVE on computer systems using a particular version of the Microsoft Windows operating system, the impact of which may be minimal, and for which a known software patch or recovery process has just become publicly available. Just as discussed above with reference to FIG. 1, these queries may be repeated at selected intervals and the data sources may include social media feeds, forums or blogs, code repositories, corporate, IT, data security service provider, or public, knowledge bases.

With reference to FIGS. 1 and 3, periodically querying data sources to gather information pertaining to the plurality of CVEs at block 102 can include, for example, selecting at block 302 a time frame or date range for the number of corresponding references to each CVE in the plurality of CVEs. Then, at block 304, the process continues with periodically querying the data sources to gather information pertaining to computing system vulnerabilities and exposures (CVEs) within the selected time frame or date range. For example, the process may periodically query the data sources to gather information pertaining to CVEs for which the number of posts or references regarding the CVEs exceeds a selected threshold within or during, for example, the last hour, day, week, month, or year, or for a previous period, such as the previous year. Just as discussed above with reference to FIG. 1, these queries may be repeated at selected intervals and the data sources may include social media feeds, forums or blogs, code repositories, corporate, IT, data security service provider, or public, knowledge bases.

In one embodiment, periodically querying at block 304 data sources to gather information pertaining to each CVE in the plurality of CVEs for which the number of corresponding references within the selected time frame or date range is greater than the selected threshold, involves periodically querying data sources to gather information pertaining to each CVE in the plurality of CVEs for which the number of corresponding unique references by one or more of a particular user and a particular data source within the selected time frame is greater than the selected threshold. This embodiment reflects the fact that a single individual or entity may repeatedly post multiple references about the same CVE, and what may be more relevant in terms of gauging just how much chatter exists online about a given CVE is how many different individuals or entities are posting at least one reference about the CVE.

With reference to FIGS. 1 and 4, generating at block 108 one or more views of a lifecycle of each CVE in response to periodically querying, at block 106, the datastore about the information, involves receiving machine and/or user input at block 402 as to the views to be generated, and then generating at block 404 one or more long-term (e.g., one or more months or years), short-term (one or more hours, days, weeks, or months), and current (e.g., real-time, hourly, daily, or weekly) views of a lifecycle of each CVE, in response to periodically querying the datastore about the information. The process then continues, at block 406, by displaying the long-term, short-term, and current views, for example, in one or more of a chart, a table, a heatmap and a timeline.

At block 408, the CVEs can be ranked, for example, based on a probability of exploitation of each CVE, which, in turn, may be based on one or more of: the number of corresponding references to each CVE, a change in a rate of the number of corresponding references to each CVE (e.g., chatter regarding a particular CVE is trending higher), and the number of code repositories that can be used to exploit each CVE. According to embodiments, the probability of exploitation of a CVE may be determined using a machine learning or statistical model that considers one or more of: the number of corresponding references to each CVE, a change in a rate of the number of corresponding references to each CVE, and the number of code repositories that can be used to exploit each CVE Finally, at block 410, alerts can be generated for one or more of the CVEs, for example, according to one or more of: the ranking of the CVEs, an identification of a previously unidentified CVE, a new instantiation of a code repository that can be used to exploit a CVE, a new instantiation of a code base or a minimum viable code base that can be used to exploit a CVE, or a new instantiation in a malware repository of a code base that can be used to exploit a CVE.

The amount of information generated and displayed at blocks 404 and 406 can be further restricted or down-selected or targeted to a subset of the CVEs, for example, according to one or more of the ranking of the CVEs at block 408, the alerts generated at block 410, or user input that further limits the time frame/date range for references to CVEs that exceed a threshold or indicates a narrowed interest in particular characteristics associated with each CVE.

The above embodiments allow a user to gather information about, and sort and view customized summaries, alerts and trends for, all kinds or types or categories of CVES, such as most prevalent CVEs (e.g., most referenced or mentioned CVEs over a selected time frame), newly identified CVEs, highly critical CVEs, broadly applicable CVEs, etc.

Figure 5:
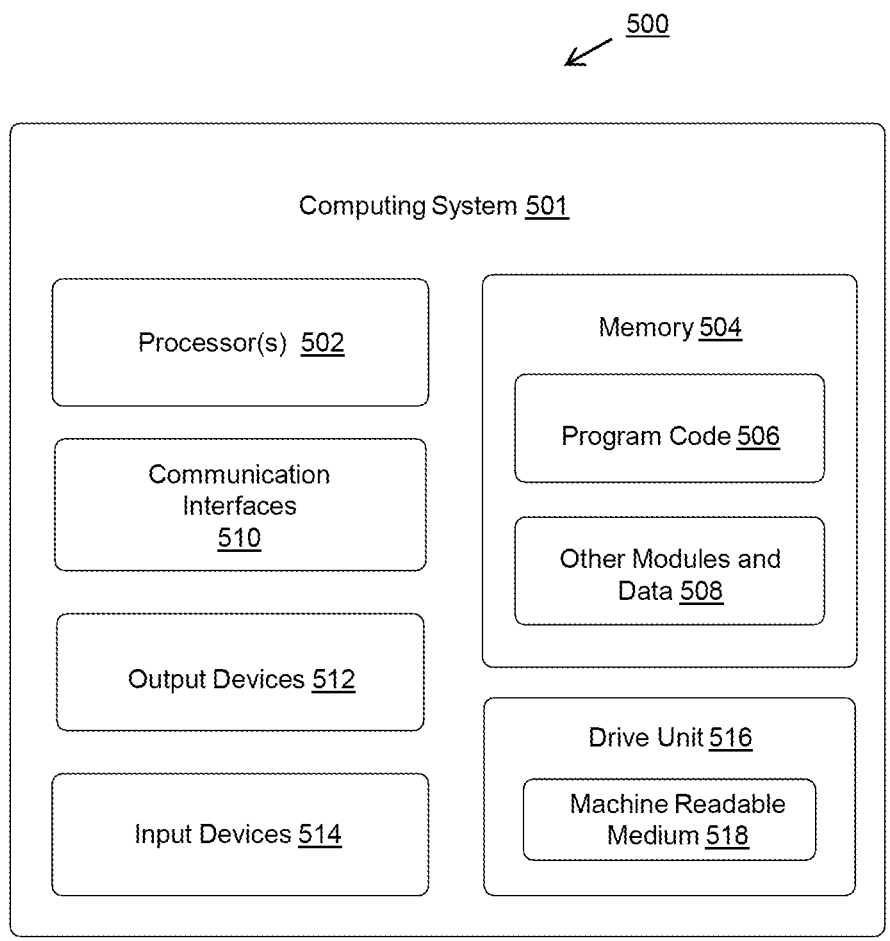
FIG. 5 illustrates an example architecture of a computing device capable of performing operations according to embodiments of the invention.

FIG. 5 shows an example computing system architecture 500 for a computing system 501 capable of carrying out the example operations described herein. The computing system 501 can be a server, computer, or other type of computing device that stores computer-executable instructions (e.g., program code 506) which, when executed by the one or more processors 502, cause the one or more processors to perform operations according to the examples described herein. In some examples, the computing system 501 can be a dedicated computing system. In other examples, the computing system 501 can be an instance of one or more virtual machines.

The computing system 501 includes memory 504. In various examples, the memory 504 can include system memory, which may be volatile (such as RAM), non-volatile (such as ROM, flash memory, non-volatile memory express (NVMe), etc.) or some combination of the two. The memory 504 can further include non-transitory computer-readable media, such as volatile and nonvolatile, removable and non-removable media implemented in any method or technology for storage of information, such as computer executable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, magnetic disk storage or other magnetic storage devices, or any other non-transitory medium which can be used to store desired information and which can be accessed by the computing system 501. Any such non-transitory computer-readable media may be part of the computing system 501.

The memory 504 can store program code 506 as well as other modules and data 508. The modules and data 508 can include any other modules and/or data that can be utilized by the computing system 501 to perform or enable performing the operations described herein. Such other modules and data can include a platform, operating system, and applications, and data utilized by the platform, operating system, and applications.

As noted above, the computing system 501 has one or more processors 502. In various examples, each of the processors 502 can be a central processing unit (CPU), a graphics processing unit (GPU), both a CPU and a GPU, or any other type of processing unit. Each of the one or more processors 502 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processors 502 may also be responsible for executing computer applications stored in the memory 504, which can be associated with types of volatile and/or nonvolatile memory.

The computing system 501 has one or more communication interfaces 510. The communication interfaces 510 can include transceivers, modems, interfaces, antennas, telephone connections, and/or other components that can transmit and/or receive data over networks, telephone lines, or other connections. For example, the communication interfaces 510 can include one or more network cards that can be used to receive the information pertaining to CVEs.

In some examples, the computing system 501 has one or more input devices 514, such as a keyboard, a mouse, a touch-sensitive display, voice input device, etc., and/or one or more output devices 512 such as a display, speakers, a printer, etc. These devices are well known in the art and need not be discussed at length here.

The computing system 501 may also include or have access to a drive unit 516 including a machine readable medium 518. The machine readable medium 518 can store one or more sets of instructions, such as software or firmware, that embodies any one or more of the methodologies or functions described herein. The instructions can also reside, completely or at least partially, within memory 504, processor(s) 502, and/or communication interface(s) 510 during execution thereof by the computing system 501. The memory 504 and the processor(s) 502 also can constitute machine readable media 518.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
    periodically querying data sources connected to a network system to gather information pertaining to a plurality of computing system vulnerabilities and exposures (CVEs), including, for each CVE: an identification of the CVE, a number of corresponding references to the CVE, and a number of code repositories that can be used to exploit the CVE;
    compiling a datastore of the information;
    periodically querying the datastore about the information; and
    generating one or more views of a lifecycle of each CVE, responsive to periodically querying the datastore about the information, wherein a view of the lifecycle of each CVE comprises the identification of the CVE, an indication of a change in the number of corresponding references to the CVE over a period of time, and an indication of a change in the number of code repositories that can be used to exploit the CVE over the period of time.

2. The method of claim 1, wherein periodically querying data sources to gather information pertaining to the plurality of CVEs comprises:
    selecting a value of one or more characteristics associated with each CVE in the plurality of CVEs, including a keyword, a software platform, a vendor, an exploitability score, an impact score, and a recommended or required interaction to eliminate or mitigate exploitation of the CVE; and
    periodically querying data sources to gather information pertaining to each CVE in the plurality of CVEs that has the selected value of the one or more of the characteristics associated with the CVE.

3. The method of claim 1, wherein periodically querying data sources to gather information pertaining to the plurality of CVEs comprises:
    selecting a time frame or date range for the number of corresponding references to each CVE in the plurality of CVEs; and
    periodically querying data sources to gather information pertaining to each CVE in the plurality of CVEs for which the number of corresponding references within the selected time frame or date range is greater than a selected threshold.

4. The method of claim 3, wherein periodically querying data sources to gather information pertaining to each CVE in the plurality of CVEs for which the number of corresponding references within the selected time frame or date range is greater than the selected threshold, comprises periodically querying data sources to gather information pertaining to each CVE in the plurality of CVEs for which a number of corresponding unique references by one or more of a particular user and a particular data source within the selected time frame or date range is greater than the selected threshold.

5. The method of claim 1, wherein generating one or more views of the lifecycle of each CVE, responsive to periodically querying the datastore about the information, comprises generating one or more long-term, short-term, and current, views of the lifecycle of each CVE, responsive to periodically querying the datastore about the information, according to one or more of a machine input and a user input; and
    further comprising displaying the long-term, short-term, and current, views of the lifecycle of each CVE in one or more of a chart, a table, a heatmap and a timeline.

6. The method of claim 5, further comprising ranking the plurality of CVEs based on a probability of exploitation of each CVE of the plurality of CVEs, which, in turn, is based on one or more of: the number of corresponding references to each CVE in the plurality of CVEs, a change in a rate of the number of corresponding references to each CVE in the plurality of CVEs, and the number of code repositories that can be used to exploit each CVE in the plurality of CVEs.

7. The method of claim 6, further comprising generating an alert for one or more of the plurality of CVEs according to one or more of: the ranking of the plurality of CVEs, an identification of a previously unidentified CVE in the plurality of CVEs, a new instantiation of a code repository that can be used to exploit a CVE in the plurality of CVEs, a new instantiation of a minimum viable code base that can be used to exploit a CVE in the plurality of CVEs, and a new instantiation in a malware repository of a code base that can be used to exploit a CVE in the plurality of CVEs.

8. The method of claim 7, wherein displaying the long-term, short-term, and current, views of the lifecycle of each CVE in the one or more of the chart, the table, the heat map and the timeline, comprises displaying the long-term, short-term, and current, views of the lifecycle of each CVE in the one or more the chart, the table, the heat map and the timeline for a subset of the plurality of CVEs based on one or more of the ranking of the plurality of CVEs, the generating of alerts for one or more of the plurality of CVEs, and user input indicating an interest in one or more of the characteristics associated with each CVE in the plurality of CVEs.

9. The method of claim 1 wherein the number of code repositories that can be used to exploit the CVE, comprises a number of public or open source code repositories that can be used to exploit the CVE, in each of which is stored at least one software development asset that can be used to exploit the CVE, including one or more of: a proof of concept document, presentation, or demo; a prototype; and a minimum viable code base that can be used to exploit the CVE.

10. A computer system, comprising:
one or more processors;
a memory to store computer-executable instructions that, when executed by the one or more processors, cause the one or more processors to perform operations comprising:
periodically querying data sources connected to a network system to gather information pertaining to a plurality of computing system vulnerabilities and exposures (CVEs), including, for each CVE: an identification of the CVE, a number of corresponding references to the CVE, and a number of code repositories that can be used to exploit the CVE; and
compiling a datastore of the information;
periodically querying the datastore about the information; and
generating one or more views of a lifecycle of each CVE, responsive to periodically querying the datastore about the information, wherein a view of the lifecycle of each CVE comprises the identification of the CVE, an indication of a change in the number of corresponding references to the CVE over a period of time, and an indication of a change in the number of code repositories that can be used to exploit the CVE over the period of time.

11. The computer system of claim 10, wherein periodically querying data sources to gather information pertaining to the plurality of CVEs comprises:
selecting a value of one or more characteristics associated with each CVE in the plurality of CVEs, including a keyword, a software platform, a vendor, an exploitability score, an impact score, and a recommended or required interaction to eliminate or mitigate exploitation of the CVE; and
periodically querying data sources to gather information pertaining to each CVE in the plurality of CVEs that has the selected value of the one or more of the characteristics associated with the CVE.

12. The computer system of claim 10, wherein periodically querying data sources to gather information pertaining to the plurality of CVEs comprises:
selecting a time frame or date range for the number of corresponding references to each CVE in the plurality of CVEs; and
periodically querying data sources to gather information pertaining to each CVE in the plurality of CVEs for which the number of corresponding references within the selected time frame or date range is greater than a selected threshold.

13. The computer system of claim 12, wherein periodically querying data sources to gather information pertaining to each CVE in the plurality of CVEs for which the number of corresponding references within the selected time frame or date range is greater than the selected threshold, comprises periodically querying data sources to gather information pertaining to each CVE in the plurality of CVEs for which a number of corresponding unique references by one or more of a particular user and a particular data source within the selected time frame or date range is greater than the selected threshold.

14. The computer system of claim 10, wherein generating one or more views of the lifecycle of each CVE, responsive to periodically querying the datastore about the information, comprises generating one or more long-term, short-term, and current, views of the lifecycle of each CVE, responsive to periodically querying the datastore about the information, according to one or more of a machine input and a user input; and
further comprising displaying the long-term, short-term, and current, views in one or more of a chart, a table, a heatmap and a timeline.

15. The computer system of claim 14, further comprising ranking the plurality of CVEs based on a probability of exploitation of each CVE of the plurality of CVEs, which, in turn, is based on one or more of: the number of corresponding references to each CVE in the plurality of CVEs, a change in a rate of the number of corresponding references to each CVE in the plurality of CVEs, and the number of code repositories that can be used to exploit each CVE in the plurality of CVEs.

16. The computer system of claim 15, further comprising generating an alert for one or more of the plurality of CVEs according to one or more of: the ranking of the plurality of CVEs, an identification of a previously unidentified CVE in the plurality of CVEs, a new instantiation of a code repository that can be used to exploit a CVE in the plurality of CVEs, a new instantiation of a minimum viable code base that can be used to exploit a CVE in the plurality of CVEs, and a new instantiation in a malware repository of a code base that can be used to exploit a CVE in the plurality of CVEs.

17. The computer system of claim 16, wherein displaying the long-term, short-term, and current, views of the lifecycle of each CVE in the one or more of the chart, the table, the heat map and the timeline, comprises displaying the long-term, short-term, and current, views of the lifecycle of each CVE in the one or more the chart, the table, the heat map and the timeline for a subset of the plurality of CVEs based on one or more of the ranking of the plurality of CVEs, the generating of alerts for one or more of the plurality of CVEs, and user input indicating an interest in one or more of the characteristics associated with each CVE in the plurality of CVEs.

18. The computer system of claim 10 wherein the number of code repositories that can be used to exploit the CVE, comprises a number of public or open source code repositories that can be used to exploit the CVE, in each of which is stored at least one software development asset that can be used to exploit the CVE, including one or more of: a proof of concept document, presentation, or demo; a prototype; and a minimum viable code base that can be used to exploit the CVE.

19. One or more non-transitory computer-readable media storing computer-executable instructions that, when executed by one or more processors, cause the one or more processors to perform operations comprising:
    periodically querying data sources connected to a network system to gather information pertaining to a plurality of computing system vulnerabilities and exposures (CVEs), including, for each CVE: an identification of the CVE, a number of corresponding references to the CVE, and a number of code repositories that can be used to exploit the CVE; and
    compiling a datastore of the information;
    periodically querying the datastore about the information; and
    generating one or more views of a lifecycle of each CVE, responsive to periodically querying the datastore about the information, wherein a view of the lifecycle of each CVE comprises the identification of the CVE, an indication of a change in the number of corresponding references to the CVE over a period of time, and an indication of a change in the number of code repositories that can be used to exploit the CVE over the period of time.

20. The non-transitory computer-readable media of claim 19, wherein the computer-executable instructions that, when executed by one or more processors, cause the one or more processors to periodically querying data sources to gather information pertaining to the plurality of CVEs comprises computer-executable instructions that, when executed by one or more processors, cause the one or more processors to perform operations comprising:
    selecting a value of one or more characteristics associated with each CVE in the plurality of CVEs, including a keyword, a software platform, a vendor, an exploitability score, an impact score, and a recommended or required interaction to eliminate or mitigate exploitation of the CVE; and
    periodically querying data sources to gather information pertaining to each CVE in the plurality of CVEs that has the selected value of the one or more of the characteristics associated with the CVE.

* * * * *